US007289998B2

(12) United States Patent
Kalos

(10) Patent No.: US 7,289,998 B2
(45) Date of Patent: Oct. 30, 2007

(54) METHOD TO UPDATE A DATA STRUCTURE DISPOSED IN AN EMBEDDED DEVICE

(75) Inventor: Matthew J. Kalos, Tucson, AZ (US)

(73) Assignee: International Business Machines Corporation, NY (US)

( * ) Notice: Subject to any disclaimer, the term of this patent is extended or adjusted under 35 U.S.C. 154(b) by 498 days.

(21) Appl. No.: 10/877,312

(22) Filed: Jun. 24, 2004

(65) Prior Publication Data

US 2005/0289544 A1 Dec. 29, 2005

(51) Int. Cl.
*G06F 7/00* (2006.01)
(52) U.S. Cl. .............. 707/100; 718/100; 711/110; 711/163; 709/223; 709/236
(58) Field of Classification Search .............. 707/100
See application file for complete search history.

(56) References Cited

U.S. PATENT DOCUMENTS

| 5,630,136 | A  |   | 5/1997  | Davidson et al. |
|-----------|----|---|---------|-----------------|
| 5,878,237 | A  | * | 3/1999  | Olarig ................ 710/309 |
| 6,073,253 | A  | * | 6/2000  | Nordstrom et al. .......... 714/25 |
| 6,430,638 | B1 |   | 8/2002  | Kessler et al. |
| 6,487,571 | B1 |   | 11/2002 | Voldman |
| 6,507,903 | B1 |   | 1/2003  | Beatty, III et al. |
| 6,578,131 | B1 |   | 6/2003  | Larson et al. |
| 2003/0005103 | A1 | * | 1/2003 | Narad et al. ............. 709/223 |
| 2003/0051113 | A1 | * | 3/2003 | Beardsley et al. .......... 711/163 |
| 2003/0131119 | A1 | * | 7/2003 | Noonan et al. ............. 709/232 |
| 2003/0158993 | A1 | * | 8/2003 | Moy ......................... 710/306 |
| 2004/0230815 | A1 | * | 11/2004 | Goodman et al. .......... 713/191 |

* cited by examiner

*Primary Examiner*—Don Wong
*Assistant Examiner*—Binh V Ho
(74) *Attorney, Agent, or Firm*—Chandler & Udall, LLP; Dale F. Regelman

(57) ABSTRACT

A method to update a data structure is disclosed. The method receives a write thread, and sets a data structure indicator to indicate that the data structure is unusable. The method creates (N) thread indicators, and assigns each of said (N) indicators to a different one of said (N) threads. Upon return to the thread dispatcher, the (i)th thread sees the data structure indicator which shows that the data structure is unusable. The method then sets the (i)th thread indicator to indicate that upon subsequent dispatches the (i)th thread will see the data structure indicator that shows that the data structure is unusable. After each of the (N) threads has seen the data structure indicator marking the data structure as unusable, the method sets the data structure indicator to indicate that the data structure is invalid, updates the data structure, and sets the data structure indicator to indicate that the data structure is valid.

19 Claims, 2 Drawing Sheets

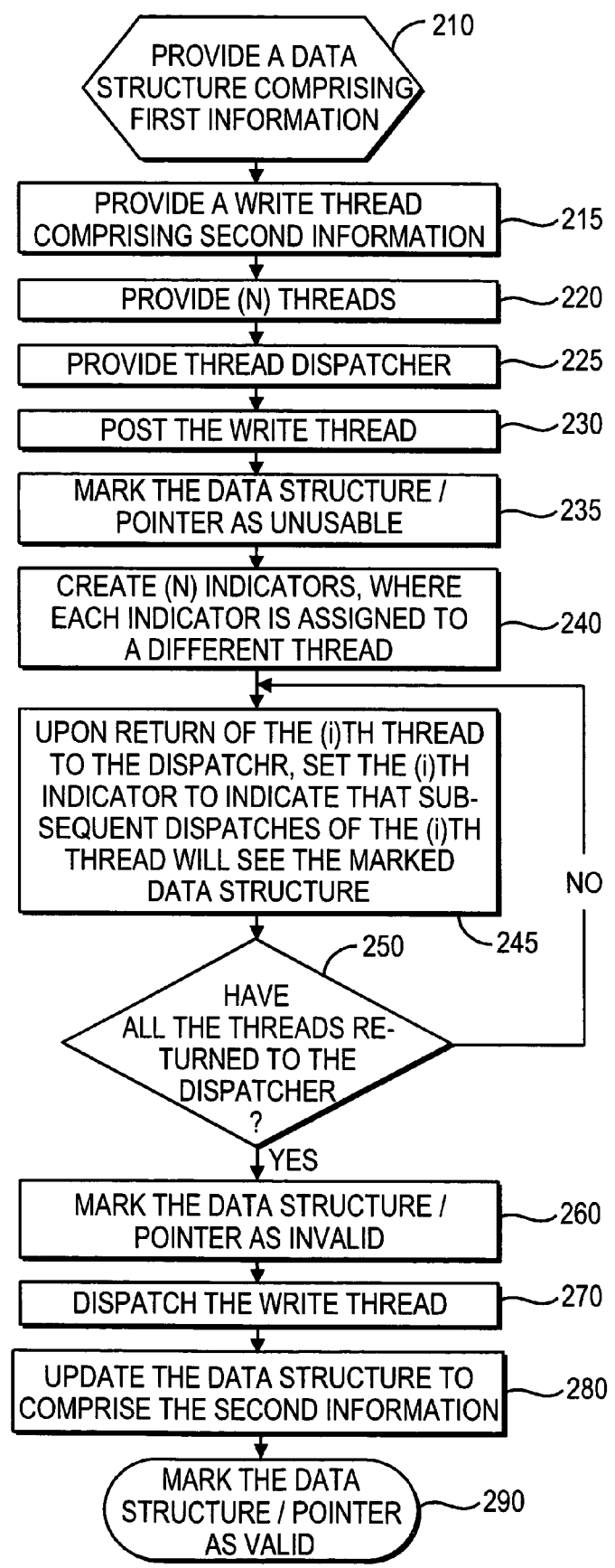

METHOD TO UPDATE A DATA STRUCTURE DISPOSED IN AN EMBEDDED DEVICE

FIELD OF THE INVENTION

This invention relates to a method for efficient serialization. In certain embodiments, the invention relates to a method to update a data structure data read by multiple threads.

BACKGROUND OF THE INVENTION

Automated media storage libraries are known for providing cost effective access to large quantities of stored media. These media libraries are often interconnected with one or more host computers. Those one or more host computers write information to one or more information storage media disposed in the library, and/or read information from those one or more information storage media.

The various components of such media storage libraries often include what are sometimes referred to as "embedded" systems, applications, or devices. Such embedded systems comprise special purposes systems requiring high performance but having relatively few dedicated resources. For example, embedded devices typically comprise relatively little memory, a low performance processor, few if any standard utilities, and no hard disks.

In addition, embedded devices typically do not comprise a conventional operating system. A conventional operating system is written for flexibility. An embedded system, however, performs a single purpose. Therefore, such an embedded device operates using a device microcode written to optimize the device's single function.

A PCI card comprises such an embedded device. Such a PCI card typically includes a processor, a flash memory, and SDRAM. A FICON interface card comprises another such embedded device.

Using prior art methods, serialization is performed using "locks." One thread obtains a lock to update or read a data structure. A second thread attempting to access the data structure must wait until the first thread completes its read/update. That second thread can then obtain the lock. These prior art methods are inefficient for structures that are updated infrequently but read frequently, such as data structures disposed in an embedded device's microcode, because the embedded device's processor must contend for the lock before being able to read the data structure.

What is needed is a method to update a data structure without first obtaining a lock. Applicant's invention includes a method to update a data structure without first obtaining a lock for that data structure.

SUMMARY OF THE INVENTION

Applicants' invention includes an apparatus and method to update a data structure disposed in an embedded device. The method provides a data structure comprising first information, (N) non-preemptable threads, a thread dispatcher, and a data structure indicator.

The method receives a write thread comprising second information, and sets the data structure indicator to indicate that the data structure is unusable. The method, creates (N) thread indicators, and assigns each of said (N) indicators to a different one of said (N) threads. Upon returning to the thread dispatcher, the (i)th thread sees the data structure indicator which indicates that the data structure is unusable. The method then sets the (i)th thread indicator.

The method determines if each of the (N) threads has seen the data structure indicator which indicates that the data structure is unusable. If each of the (N) threads has seen the data structure indicator which indicates that the data structure is unusable, then the method sets the data structure indicator to indicate that the data structure is invalid, updates the data structure to comprise the second information, and sets the data structure indicator to indicate that the data structure is valid.

BRIEF DESCRIPTION OF THE DRAWINGS

The invention will be better understood from a reading of the following detailed description taken in conjunction with the drawings in which like reference designators are used to designate like elements, and in which:

FIG. 2 is a flow chart summarizing the steps of Applicant's method.

DETAILED DESCRIPTION OF THE PREFERRED EMBODIMENTS

Figure 1:
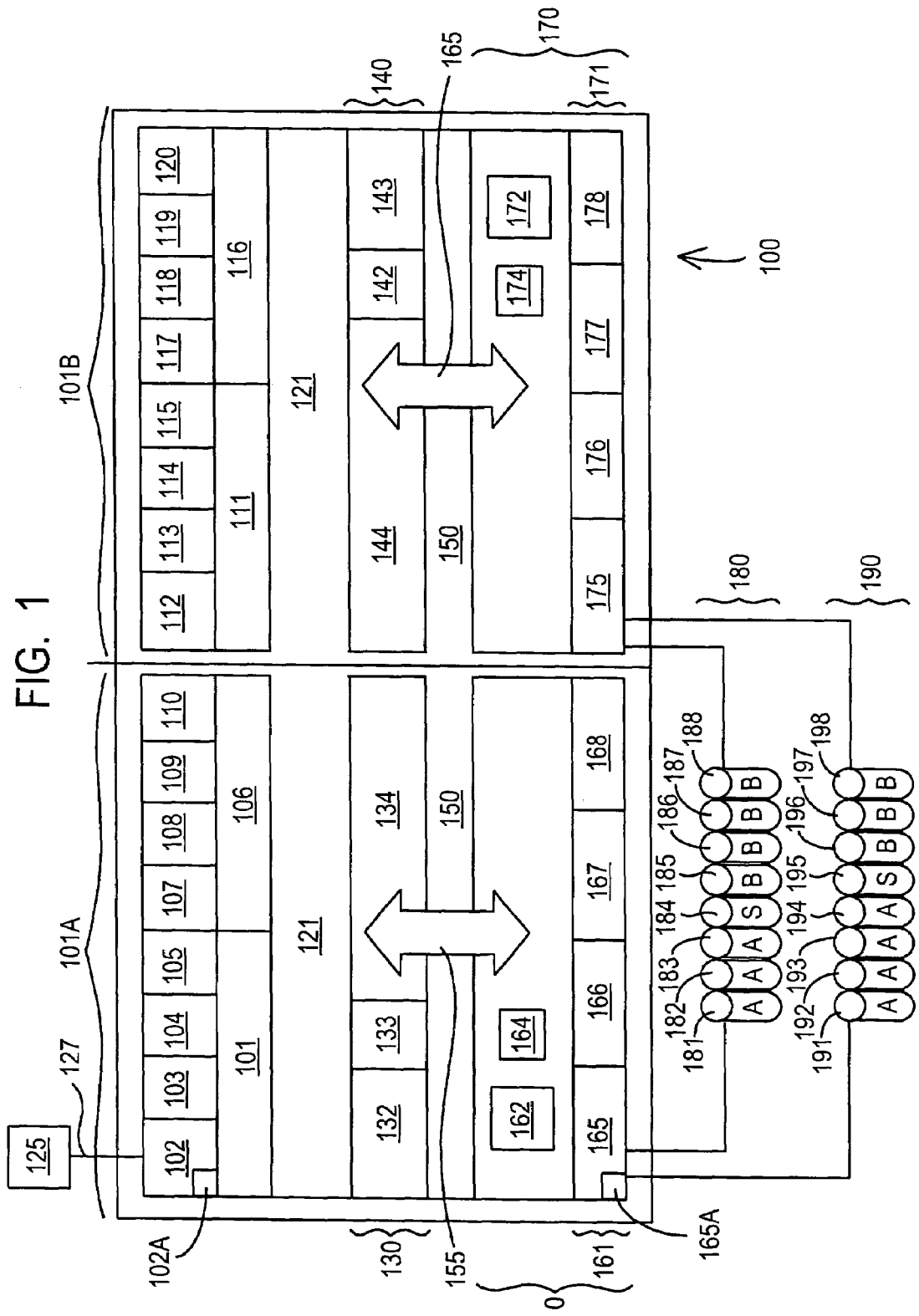
FIG. 1 is a block diagram showing Applicant's information storage and retrieval system.

This invention is described in preferred embodiments in the following description with reference to the Figures, in which like numbers represent the same or similar elements. The invention will be described as embodied in an information storage and retrieval subsystem for use in a data processing environment. The following description of Applicant's method to update a data structure read by multiple threads is not meant, however, to limit Applicant's invention to either data storage and retrieval systems, or to data processing applications, as the invention herein can be applied to updating a data structure in general.

In the illustrated embodiment of FIG. 1, Applicants' information storage and retrieval system 100 includes a first cluster 101A and a second cluster 101B. Each cluster includes a processor portion 130/140 and an input/output portion 160/170, respectively. Internal PCI buses in each cluster are connected via a Remote I/O bridge 155/165 between the processor portions 130/140 and device I/O portions 160/170, respectively.

In the illustrated embodiment of FIG. 1, system 100 is capable of communicating with host computer 125 via communication link 127. In certain embodiments, communication link 127 is selected from a serial interconnection, such as RS-232 or RS-422, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

Information storage and retrieval system 100 further includes a plurality of host adapters 102-105, 107-110, 112-115, and 117-120, disposed in four host bays 101, 106, 111, and 116. Each host adapter may comprise one or more Fibre Channel ports, one or more FICON ports, one or more ESCON ports, or one or more SCSI ports. Each host adapter is connected to both clusters through one or more Common Platform Interconnect bus 121 such that each cluster can handle I/O from any host adapter.

Processor portion 130 includes processor 132 and cache 134. In certain embodiments, processor portion 130 further include memory 133. In certain embodiments, memory device 133 comprises random access memory. In certain embodiments, memory device 133 comprises non-volatile memory.

Processor portion 140 includes processor 142 and cache 144. In certain embodiments, processor portion 140 further include memory 143. In certain embodiments, memory device 143 comprises random access memory. In certain embodiments, memory device 143 comprises non-volatile memory.

I/O portion 160 includes non-volatile storage ("NVS") 162 and NVS batteries 164. I/O portion 170 includes NVS 172 and NVS batteries 174.

I/O portion 160 further comprises a plurality of device adapters, such as device adapters 165, 166, 167, and 168, and information storage media organized into two arrays, namely array "A" and array "B". The illustrated embodiment of FIG. 1 shows two information storage arrays. In other embodiments, Applicants' information storage and retrieval system includes more than two information storage arrays. Each such information storage array appears to a host computer as one or more logical devices.

In certain embodiments, Applicants' information storage media comprise magnetic media, such as for example hard disks disposed in individual hard disk drive units. In certain embodiments, Applicants' information storage media comprise optical media, such as for example CDs, DVDs, and the like. In certain embodiments, Applicants' information storage media comprise electronic storage media, such as PROMs, EPROMs, EEPROMs, Flash PROMs, compact-flash, smartmedia, and the like.

In certain embodiments, arrays "A" and "B" utilize a RAID protocol. In certain embodiments, arrays "A" and "B" comprise what is sometimes called a JBOD array, i.e. "Just a Bunch Of Disks" where the array is not configured according to RAID. As those skilled in the art will appreciate, a RAID (Redundant Array of Independent Disks) rank comprises independent information storage media configured in an array to obtain performance, capacity and reliability that exceeds that of a single large storage medium.

In the certain embodiments, array "A" includes hard disk drives 181, 182, 183, 191, 192, 193, and 194, and array "B" includes hard disk drives 185, 186, 187, 188, 196, 197, and 198.

FIG. 2 summarizes the steps of Applicant's method. Referring now to FIG. 2, in step 210 Applicant's method provides a data structure comprising first information. In certain embodiments, the data structure of step 210 comprises a control flag to begin or end special processing.

In step 215, Applicant's method provides a write thread comprising second information. As those skilled in the art will appreciate, a thread is a path of execution of a process, and the thread context is the task. In certain embodiments, the write thread of step 215 is provided by a host computer interconnected to Applicant's information storage and retrieval system. In certain embodiments, the write thread of step 215 is provided by a processor disposed in Applicant's information storage and retrieval system. In certain embodiments, the write thread of step 215 is provided by a processor disposed in an embedded device, such as for example a host adapter or a device adapter, disposed in Applicant's information storage and retrieval system. In certain embodiments, the write thread of step 215 comprises part of device microcode disposed in an embedded device disposed in Applicant's information storage and retrieval system, such as for example device microcode 102A (FIG. 1) disposed in host adapter 102 (FIG. 1) or device microcode 165A (FIG. 1) disposed in device adapter 165 (FIG. 1).

In step 220, Applicant's method provides (N) non-preemptable threads. By "non-preemptable threads," Applicant means a thread which will return to the dispatcher in a finite amount of time. As those skilled in the art will appreciate, most operating systems allow a thread to never return to the dispatcher, but those operating systems may periodically preempt such non-reporting threads and switch to other threads. One or more of these (N) non-preemptable threads comprise read threads. In certain embodiments, one or more of the (N) threads of step 220 comprise part of device microcode disposed in an embedded device disposed in Applicant's information storage and retrieval system, such as for example device microcode 102A (FIG. 1) disposed in host adapter 102 (FIG. 1) or device microcode 165A (FIG. 1) disposed in device adapter 165 (FIG. 1).

In step 225, Applicant's method provides a thread dispatcher. In certain embodiments, this thread dispatcher comprises part of device microcode disposed in an embedded device disposed in Applicant's information storage and retrieval system.

In step 230, Applicant's method posts the write thread of step 215. In certain embodiments, step 230 is performed by device microcode disposed in an embedded device disposed in Applicant's information storage and retrieval system.

In step 235, Applicant's method marks the data structure of step 210 as unusable. In certain embodiments, step 235 includes providing a data structure indicator. In certain embodiments, that data structure indicator comprises a pointer. In certain embodiments, Applicant's device microcode includes such a pointer pointing to the data structure of step 210. In these embodiments, step 235 includes setting that pointer to indicate that the data structure is unusable. In certain embodiments, step 235 is performed by device microcode disposed in an embedded device disposed in Applicant's information storage and retrieval system. In certain embodiments, step 235 is performed by a processor disposed in an embedded device disposed in Applicant's information storage and retrieval system. In certain embodiments, step 235 is performed by the write thread of step 215.

In step 240, Applicant's method, in response to the posting of the write thread in step 230, creates (N) indicators, where each of those (N) indicators is assigned to a different one of the (N) threads, and where each of those indicators can be set to one of two values, and where each of those indicators is initially set to the first value. If the (i)th indicator is set to the first value, then the (i)th thread has not examined the data structure indicator set in step 235. Alternatively, if the (i)th indicator is set to the second value, then subsequent dispatches of the (i)th read thread will see the data structure indicator which indicates that the data structure is unusable.

In certain embodiments, the (N) indicators of step 240 comprise a bitmask which includes (N) bits. Each of those bits can be set to either a first value or a second value. In certain embodiments, the first value comprises a "0", and the second value comprises a "1."

In certain embodiments, step 240 is performed by a processor disposed in Applicant's information storage and retrieval system. In certain embodiments, step 240 is performed by a processor disposed in an embedded device disposed in Applicant's information storage and retrieval system. In certain embodiments, step 240 is performed by a processor using device microcode disposed in an embedded device disposed in Applicant's information storage and retrieval system. In certain embodiments, step 240 is performed by the write thread of step 215. In certain embodiments, step 240 is performed by the thread dispatcher of step 225.

Each time the thread dispatcher dispatches one of the (N) threads, that dispatched thread returns to the thread dispatcher after completing its task. In addition, each of the (N) threads returns to the thread dispatcher after a specified time interval. Upon returning to the thread dispatcher, the (i)th thread sees the data structure indicator set in step 235. In step 245, after the (i)th thread returns to the thread dispatcher and sees the data structure indicator which indicates that the data structure is unusable, Applicant's method sets the (i) thread indicator to the second value, i.e. to indicate that upon subsequent dispatches the (i)th thread will see the data structure marked as unusable. In certain embodiments, step 245 is performed by the thread dispatcher.

In step 250, the method determines if each of the (N) threads has seen the data structure indicator showing that the data structure is unusable, i.e. if the thread indicator for each of the (N) threads is set to the second value. In certain embodiments, step 250 is performed by a processor disposed in Applicant's information storage and retrieval system. In certain embodiments, step 250 is performed by a processor disposed in an embedded device disposed in Applicant's information storage and retrieval system. In certain embodiments, steps 250 is performed by the write thread of step 215. In certain embodiments, step 250 is performed by the thread dispatcher of step 225.

If Applicant's method determines in step 250 that each of the (N) threads has not seen the indication that the data structure is unusable, then the method transitions from step 255 to step 245 and continues. Alternatively, if Applicant's method determines in step 250 that each of the (N) threads indicators is set to the second value, i.e. upon a subsequent dispatch each of the (N) threads has seen the indication that the data structure is unusable, then the method transitions from step 250 to step 260 wherein the method sets the data structure indicator of step 235 to indicate that the data structure is invalid. In certain embodiments, step 260 includes setting a pointer pointing to that data structure to indicate that the data structure is invalid.

In certain embodiments, step 260 is performed by a processor disposed in Applicant's information storage and retrieval system. In certain embodiments, step 260 is performed by a processor disposed in an embedded device disposed in Applicant's information storage and retrieval system. In certain embodiments, step 260 is performed by the write thread of step 215. In certain embodiments, step 260 is performed by the thread dispatcher of step 230.

Applicant's method transitions from step 260 to step 270 wherein the method dispatches the write thread posted in step 230. In certain embodiments, step 270 is performed by a processor disposed in Applicant's information storage and retrieval system. In certain embodiments, step 270 is performed by a processor disposed in an embedded device disposed in Applicant's information storage and retrieval system. In certain embodiments, steps 270 is performed by the write thread of step 215. In certain embodiments, step 270 is performed by the thread dispatcher of step 225.

Applicant's method transitions from step 270 to step 280 wherein the write thread updates the data structure to comprise second information. Applicant's method transitions from step 280 to step 290 wherein the method sets the data structure indicator to indicate that the data structure is valid. In certain embodiments, step 290 includes setting a pointer pointing to that data structure to indicate that the data structure is valid. In certain embodiments, step 290 is performed by a processor disposed in Applicant's information storage and retrieval system. In certain embodiments, step 290 is performed by a processor disposed in an embedded device disposed in Applicant's information storage and retrieval system. In certain embodiments, step 290 is performed by the write thread of step 215. In certain embodiments, step 290 is performed by the thread dispatcher of step 225.

In certain embodiments, individual steps recited in FIG. 2 may be combined, eliminated, or reordered.

In certain embodiments, Applicants' invention includes instructions residing in memory 133 (FIG. 1), where those instructions are executed by processor 132 (FIG. 1) to performs steps 230, 235, 240, 245, 250, 260, 270, 280, and 290, recited in FIG. 2. In other embodiments, Applicants' invention includes instructions residing in any other computer program product, where those instructions are executed by a computer external to, or internal to, system 100, to perform steps 230, 235, 240, 245, 250, 260, 270, 280, and 290, recited in FIG. 2. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

I claim:

1. A method to update a data structure disposed in an embedded device, comprising the steps of:

providing a data structure comprising first information;

providing a write thread comprising second information;

providing (N) non-preemptable threads, wherein (N) is greater than 1;

providing a thread dispatcher; providing a data structure indicator;

setting said data structure indicator to indicate that said data structure is unusable;

creating (N) thread indicators comprising a bitmask which includes (N) bits, wherein each of those bits can be set to either a first value or a second value, and wherein each bit is initially set to said first value;

assigning each of said (N) thread indicators to a different one of said (N) threads; upon return of the (i)th thread to the thread dispatcher, setting the (i)th thread indicator to said second value, wherein (i) is greater than or equal to 1 and less than or equal to (N);

determining if the thread indicators for each of said (N) threads are set to said second value; operative if the thread indicators for each of said (N) threads are set to said second value:

setting said data structure indicator to indicate that said data structure is invalid;

updating said data structure to comprise said second information;

and setting said data structure indicator to indicate that said data structure is valid.

2. The method of claim 1, further comprising the step of providing a computing device comprising an embedded device, wherein said embedded device comprises device microcode, and wherein said microcode includes said data structure.

3. The method of claim 1, further comprising the steps of:
dispatching the (i)th thread by said thread dispatcher;
returning to said thread dispatcher by said (i)th thread.

4. The method of claim 3, further comprising the step of:
providing a pointer for said data structure;
wherein said step setting a data structure indicator to indicate that said data structure is unusable further comprises setting said pointer to indicate that said data structure is unusable;
wherein said step setting said data structure indicator to indicate that said data structure is invalid further comprises setting said pointer to indicate that said data structure is invalid;
wherein said step setting said data structure indicator to indicate that said data structure is valid further comprises setting said pointer to indicate that said data structure is valid.

5. The method of claim 1, wherein said assigning step further comprises assigning each of said (N) bits to a different one of said (N) threads.

6. The method of claim 1, further comprising the step of posting said write thread using said thread dispatcher.

7. The method of claim 6, further comprising the steps of:
determining if a write thread is posted;
operative if a write thread is posted, creating said (N) indicators.

8. The method of claim 7, wherein the step setting said data structure indicator to indicate that said data structure is invalid further comprises the step of dispatching said write thread by said thread dispatcher.

9. An article of manufacture comprising:
microcode which includes a data structure comprising first information, (N) non-preemptable threads, a thread dispatcher, a data structure indicator, and computer readable storage medium having computer readable program code disposed therein to update said data structure, wherein (N) is greater than 1, the computer readable program code comprising a series of computer readable program steps to effect:
receiving a write thread comprising second information;
setting said data structure indicator to indicate that said data structure is unusable;
creating (N) thread indicators comprising a bitmask which includes (N) bits, wherein each of those bits can be set to either a first value or a second value, and wherein each bit is initially set to said first value;
assigning each of said (N) thread indicators to a different one of said (N) threads;
upon return of the (i)th thread to the thread dispatcher, setting the (i)th thread indicator to said second value, wherein (i) is greater than or equal to 1 and less than or equal to (N);
determining if the thread indicators for each of said (N) threads are set to said second value;
operative if the thread indicators for each of said (N) threads are set to said second value:
setting said data structure indicator to indicate that said data structure is invalid;
updating said data structure to comprise said second information; and
setting said data structure indicator to indicate that said data structure is valid.

10. The article of manufacture of claim 9, wherein said microcode further comprises a pointer for said data structure, wherein:
the computer readable program code to set said data structure indicator to indicate that said data structure is unusable further comprises a series of computer readable program steps to effect setting said pointer to indicate that said data structure, is unusable;
the computer readable program code to set said data structure indicator to indicate that said data structure is invalid further comprises a series of computer readable program steps to effect setting said pointer to indicate that said data structure is invalid;
the computer readable program code set said data structure indicator to indicate that said data structure is valid further comprises a series of computer readable program steps to effect setting said pointer to indicate that said data structure is valid.

11. The article of manufacture of claim 9, further comprising the step of assigning each of said (N) bits to a different one of said (N) threads.

12. The article of manufacture of claim 9, said computer readable program code further comprising a series of computer readable program steps to effect posting said write thread.

13. The article of manufacture of claim 12, said computer readable program code further comprising a series of computer readable program steps to effect:
determining if a write thread is posted; operative if a write thread is posted, creating said (N) thread indicators.

14. The article of manufacture of claim 13, said computer readable program code further comprising a series of computer readable program steps to effect dispatching said write thread after setting said data structure indicator to indicate that the data structure is invalid.

15. A computer program product:
embodied in computer readable storage medium, said computer program product being useable with a programmable computer processor to update a data structure disposed in device microcode, wherein said device microcode further comprises (N) non-preemptable threads, a thread dispatcher, a data structure indicator, and wherein said data structure comprises first information, wherein (N]) is greater than 1, comprising:
computer readable program code which causes said programmable computer processor to receive a write thread comprising second information;
computer readable program code which causes said programmable computer processor to set said data structure indicator to indicate that said data structure is unusable;
computer readable program code which causes said programmable computer processor to create (N) thread indicators comprising a bitmask which includes (N) bits, wherein each of those bits can be set to either a first value or a second value, and wherein each bit is initially set to said first value;
computer readable program code which causes said programmable computer processor to assign each of said (N) thread indicators to a different one of said (N) threads;
computer readable program code which, upon return of the (i)th thread to the thread dispatcher, causes said programmable computer processor to set the (i)th thread indicator to said second value, wherein (i) is greater than or equal to 1 and less than or equal to (N);

computer readable program code which causes said programmable computer processor to determine if the thread indicators for each of said (N) threads are set to indicate that upon a subsequent dispatch each of those (N) threads will see said data structure indicator indicating that said data structure is unusable;

computer readable program code which, if the thread indicators for each of said (N) threads are set said second value, causes said programmable computer processor to:

set said data structure indicator to indicate that said data structure is invalid;

update said data structure to comprise said second information;

and set said data structure indicator to indicate that said data structure is valid.

16. The computer program product of claim 15, further comprising computer readable program code which causes said programmable computer processor to assign each of said (N) bits to a different one of said (N) threads.

17. The computer program product of claim 15, further comprising computer readable program code which causes said programmable computer processor to post said write thread.

18. The computer program product of claim 17, further comprising:

computer readable program code which causes said programmable computer processor to determining if a write thread is posted;

computer readable program code which, if a write thread is posted, causes said programmable computer processor to create said (N) thread indicators.

19. The computer program product of claim 18, further comprising computer readable program code which causes said programmable computer processor to dispatch said write thread after setting said data structure indicator to indicate that said data structure is invalid.

* * * * *